United States Patent
Räisänen (10) Patent No.: US 7,685,696 B2
(45) Date of Patent: Mar. 30, 2010

(54) METHOD OF MANUFACTURING AN ELECTROMECHANICAL SENSOR ELEMENT

(75) Inventor: Heikki Räisänen, Jyväskylä (FI)

(73) Assignee: Emfitech Oy, Vaajakoski (FI)

( * ) Notice: Subject to any disclaimer, the term of this patent is extended or adjusted under 35 U.S.C. 154(b) by 1527 days.

(21) Appl. No.: 10/996,263

(22) Filed: Nov. 23, 2004

(65) Prior Publication Data

US 2005/0093401 A1 May 5, 2005

Related U.S. Application Data (63) Continuation of application No. 10/018,413, filed as application No. PCT/FI00/00607 on Jul. 3, 2000, now Pat. No. 6,996,891.

(30) Foreign Application Priority Data

Jul. 1, 1999 (FI) .................................. 991506

(51) Int. Cl.
G01R 3/00 (2006.01)

(52) U.S. Cl. ............................ 29/595; 29/417; 29/609; 29/831; 29/846; 73/774; 156/164; 156/229; 156/273.1; 156/273.3; 156/273.9; 310/311; 310/314; 310/317; 310/344; 381/114; 381/116; 381/191

(58) Field of Classification Search ............... 73/774; 29/417, 592.1, 595, 609, 831, 846; 156/164, 156/229, 273.1, 273.3, 273.9, 274.6, 308.2, 156/322, 324; 310/311, 314, 317, 344; 381/114, 381/116, 191

See application file for complete search history.

(56) References Cited

U.S. PATENT DOCUMENTS

| 4,654,546 A | 3/1987 | Kirjavainen |
| 4,874,659 A | 10/1989 | Ando et al. |
| 5,912,759 A * | 6/1999 | Good et al. .................. 359/297 |
| 5,961,762 A | 10/1999 | Zelinka et al. |

FOREIGN PATENT DOCUMENTS

| DE | 42 37 072 | 12/1993 |
| DE | 196 36 543 | 3/1997 |
| WO | 90/16089 | 12/1990 |
| WO | 92/10070 | 6/1992 |
| WO | 95/01079 | 1/1995 |
| WO | 97/39602 | 10/1997 |
| WO | 96/06718 | 9/1999 |

* cited by examiner

*Primary Examiner*—Paul D Kim
(74) *Attorney, Agent, or Firm*—Katten Muchin Rosenman LLP (57) ABSTRACT

The invention relates to a method for the manufacture of a sensor element and to a sensor element. In the method, both surfaces of a sensor film are provided with metallic electrodes. The sensor element is produced by cutting it from a larger amount of sensor element material. In the manufacture of the sensor element material, the electrodes are produced as a continuous process from roll to roll and the sensor element material is formed by laminating as a continuous process from roll to roll. At least the signal electrode consists of repeated electrode patterns (41) which are at least partially connected to each other via one or more narrow connecting strips (42), and a sensor element of a desired length and/or shape is produced by cutting the material across the region of the connecting strips.

15 Claims, 9 Drawing Sheets

METHOD OF MANUFACTURING AN ELECTROMECHANICAL SENSOR ELEMENT

CROSS-REFERENCE TO RELATED APPLICATION

The present application is a continuation of U.S. patent application Ser. No. 10/018,413 which was filed on Apr. 26, 2002 now U.S. Pat. No. 6,996,891 which is hereby incorporated by reference. U.S. patent application Ser. No. 10/018,413 is an application filed under 35 U.S.C. §371 of PCT/FI00/00607 filed on Jul. 3, 2000, which was published in English and to which application Ser. No. 10/018,413 claims priority, and which claims priority to Finish Application 991506 filed on Jul. 1, 1999.

The present invention relates to a method for the manufacture of an electromechanical sensor element and to a sensor element.

BACKGROUND OF THE INVENTION

Previously known is a so-called electret field, i.e. a permanent electric charge injected into a dielectric material by ionizing. A film applicable for use as a sensor film in the sensor element of the invention is presented in U.S. Pat. No. 4,654,546, in which a dielectric plastic film, such as polypropylene, containing flat or torn gas bubbles or voids is used to form a so-called cellular electret film. Both surfaces of the film are metal-coated. WO specification 96/06718 presents a method for swelling a foamed plastic film, whereby the amount of gas contained in the film can be more than doubled. Patent specification FI 913741 presents various electric structures for sensor elements. Previously known are also fibrous polarized electret films, as presented e.g. in U.S. Pat. No. 4,874,659. Other known elements applicable in the sensor element of the invention are piezoelectric sensor films, such as PVDF.

Sensor elements and sensor bands (ribbons) as provided by the invention, which have a relatively large area or length, connected to a suitable signal processing apparatus or system, can be used for many different purposes. Possible applications are for example sensors installed in a road structure for determining the weight of a moving vehicle, registration and monitoring of a patient's vital functions (breathing, heartbeat and snoring) using a sensor placed in the bed under the mattress e.g. in conjunction with sleep research, monitoring of the vital functions of a drunken person by means of a sensor installed in the floor of a jail, sensors mounted under a carpet in an old-age home to monitor an old person's getting up from bed, sensors mounted under a floor coating in the vestibule of a bank or shopping center and connected to an alarm system. From a long sensor band installed on a fence around an industrial area, using suitable software, it is possible to notify a possible intruder and its location when both ends of the sensor band are connected to a signal processing device. A sensor element may also be mounted inside a floor structure under a large machine, such as a paper machine, to monitor its operation. They can also be used in various safety applications, e.g. to make sure that a machine will not be started before its operator is in the proper place, and so on. In addition, this type of sensor elements can be used in sports e.g. to measure the force and duration of exertion. They can also be used as different kinds of switches, such as light switches, or in underwater ultrasound measurements. Moreover, a signal, e.g. an ultrasound signal can be fed into the sensor to make it vibrate. Sensors according to the invention can also be used in various keyboards, in cages for test animals for the measurement of motional activity, monitoring of the vital functions of an animal recovering from a surgical operation, and so on. When such large sensor elements are applied, a plurality of sensors are used and the signals obtained from them can be compared and summed to eliminate unnecessary signals or to draw other conclusions, e.g. by installing several sensors of opposite polarities in the floor of the same space it is possible to eliminate e.g. signals produced by the vibration of an air conditioner or the building itself and pick out the breath and pulse of a person lying on the floor. Traditionally, this type of large sensor elements or bands have been manufactured by cutting a sensor element of a size suited for the intended use e.g. from sensor material coiled up on a roll and consisting of a metal film with sensor films, e.g. electrically charged electret bubble films, laminated on its both surfaces so that the positively charged sides lie against the metal film, with further metal films laminated against the negative side on the outer surfaces of the laminate thus formed. When a force is applied to such an element, an electric charge is generated between the signal electrode in the core and the earth electrodes on the outer surfaces. A metal electrode may also be placed directly on the surface of the sensor film, e.g. by evaporating, as described e.g. in U.S. Pat. No. 4,654,546. Another commonly used method is to print an electrode pattern of silver pasta on the surface of a polyester film and laminate it together with a sensor film. With the first-mentioned methods, a problem in the manufacture of large sensor elements like this is that the sensors are sensitive to electromagnetic interference and discharges of static electricity. This is due to the fact that, as the sensor is cut from material in which the signal electrode is of the same size with the sensor material, it extends to the very edges of the sensor element. Therefore, the edge areas of the elements need to be separately provided with metal films extending over the edges, these metal films being grounded. Another big problem is that when the material is being cut, the small metal particles released during cutting are apt to form a short circuit between the signal electrode and the earth electrode. When the electrode surfaces are made from silk-screen printed silver pasta, the price becomes very high as silver pasta is very expensive. As compared with the manufacturing method of the invention, the price of an electrode surface printed with silver pasta is multiple times higher.

SUMMARY OF THE INVENTION

The object of the present invention is to eliminate the drawbacks of prior-art technology and to achieve a new manufacturing method that makes it possible to manufacture sensor material in an economic and environmentally friendly manner via mass production as continuous material from which it is possible to cut interference-free sensor elements that are suited for many uses and applications as desired. The invention also concerns a new technique for making connections to sensors according to the invention.

Another object of the invention is to provide a method to manufacture large-area sensors with automatic elimination (zeroing) of signals generated by for example air-pressure or vibration forces applied over the whole area of the sensor. For example signals produced due air ventilation or the building itself vibrating due heavy nearby traffic must often be eliminated to avoid false alarms or information and to pick-up only the necessary signals such as breath or pulse of a person lying on the bed or floor or step of intruder on the ground.

In the method of the invention, both outer surfaces of a sensor film, such as a dielectric bubble film, in which a permanent electric charge has been injected by ionizing and which may also consist of a number of films glued together, are provided with film-like metal electrodes, and the outer surface of at least one of the metal electrodes is provided with a film-like dielectric material, which may also consist of the same electromechanical sensor film. In the method, a sensor element is produced by cutting it from a larger amount of sensor element material in which at least the signal electrode has a patterned design.

The features characteristic of the method and sensor element of the invention are presented in detail in the independent claims below.

The sensor element material according to a preferred embodiment of the invention can be cut at short distances into pieces of suitable size for each application, both crosswise and lengthways if necessary. Connections to the sensor material can also be easily made to the side of the material width or by using advantageous tools as provided by the invention. A perforated sensor element according to one embodiment of the invention can also be reliably mounted on the surface of a finished concrete floor or, during casting, inside the floor. The method of the invention is characterized by what is said in the claims below.

One embodiment of the invention is characterized in that repeated electrode patterns are formed at least in the signal electrode material, said patterns being connected to each other via one or more narrow connecting strips but otherwise disposed in separation from each other, and that the sensor element is formed from sensor element material by cutting the element into a desired length across the region of a connecting strip.

One other embodiment of the invention is characterized in that a connection to the zero, ground and signal electrodes of the sensor is made by cutting off pieces of the zero and ground electrodes from the outermost layers on opposite sides using a tool as provided by the invention. The tool makes a cut with a great accuracy, of the order of 5/100 mm, to a desired depth, allowing a connection to be made to the signal electrode in the core using a reliable crimp connector or rivet.

Another embodiment of the invention is characterized in that, in certain areas on the signal, ground and zero electrodes, a small spot on the aluminum electrode has been printed with silver pasta to ensure a connection as reliable as possible.

In a preferred embodiment of the invention, a typical feature is that its signal, ground and zero electrodes are manufactured by a silk-screen printing technique or by printing (e.g. ink jet printing), using e.g. a dielectric material dryable by UV light, an electrode pattern on the surface of the metal film placed on the dielectric film and etching off the portions outside the pattern. Both the printing, drying, etching and washing of the electrode pattern are performed in a reel-to-reel process. Likewise, the gluing together, i.e. lamination of the electrode material and the active electromechanical film is performed in a reel-to-reel process.

In one embodiment of the invention, in which the sensor element needs to be fastened as reliably as possible to the surface of a concrete floor, the element is provided with holes at regular distances, allowing the element to be fastened using a thin liquid cement-based putty for the leveling of concrete floors as it can stick directly to the floor surface via the holes. Such a sensor element can also be embedded inside a concrete casting at the casting stage and fastened to the reinforcements.

Another essential feature of a preferred embodiment of the invention is that the electret bubble film has been swelled before being charged, e.g. in a manner as described in WO publication 96/06718, thereby increasing the amount of gas contained in it to a level exceeding 50%. When a film that instead of being only biaxially (2-axis) oriented, is also swelled in thickness ($3^{rd}$ axis) by high pressure gas expansion, and when the film is then charged, its sensitivity after the swelling is increased to a value multiple times higher than for a film with only 2-axis orientation.

Further, when an electret bubble film is used, the invention is characterized in that the sensor element has been subjected to intensive aging by storing it for several days at a temperature slightly over the desired operating temperature, e.g. at 65° C. when the desired maximum operating temperature is 60° C., the sensitivity of the sensor being thereby lowered as compared with the initial situation to a level of the order of 20-25% of the original sensitivity. This makes the sensor very stable for the desired maximum operating temperature. The storage temperature and period depend on the desired operating temperature. In normal conditions, a pre-aging treatment lowering the sensitivity by 50% as compared with the initial level is sufficient.

By the methods of the invention, sensor element material can be manufactured fast and economically via mass production and coiled up in rolls, from which the material can be cut into pieces of desired length and width to form interference-free and reliable film-like sensor elements. In addition, the method of the invention, when aluminum electrodes are used, allowing the etching to be performed using iron chloride, is very economic and environmentally friendly.

BRIEF DESCRIPTION OF THE DRAWINGS

In the following, the invention will be described in detail by the aid of an example with reference to the attached drawings, wherein.

DETAILED DESCRIPTION OF THE DRAWINGS

Figure 1:
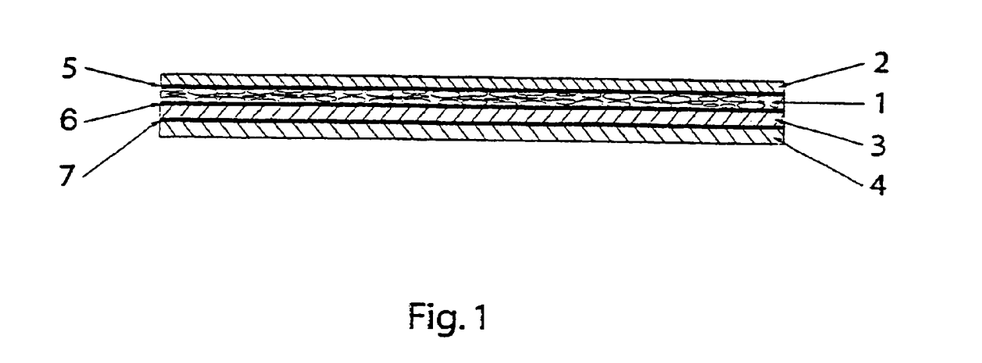
FIG. 1 presents a sensor element according to a preferred embodiment of the invention in lateral section.
Figure 2A:
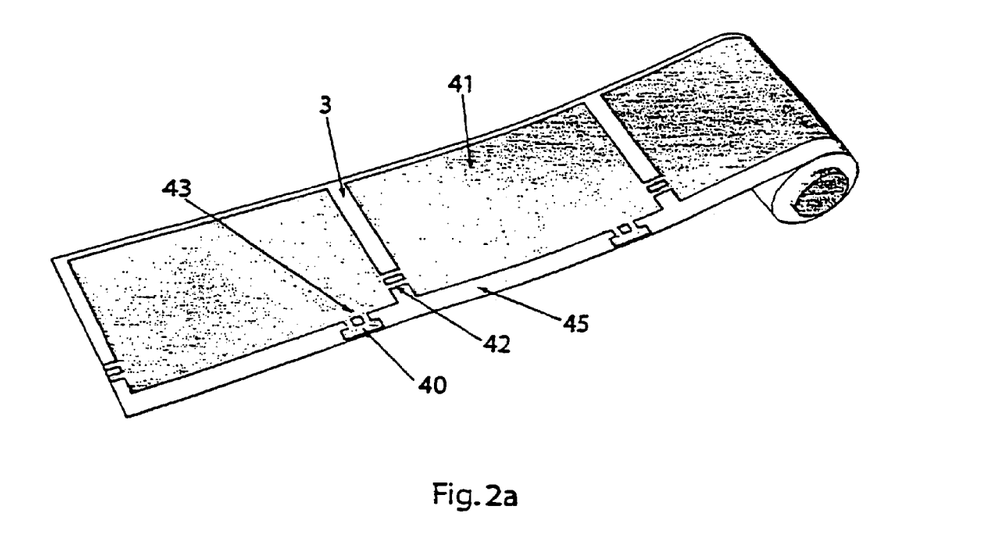
FIGS. 2a and 2b present the signal electrode of a sensor element according to the invention in top view.
Figure 2B:
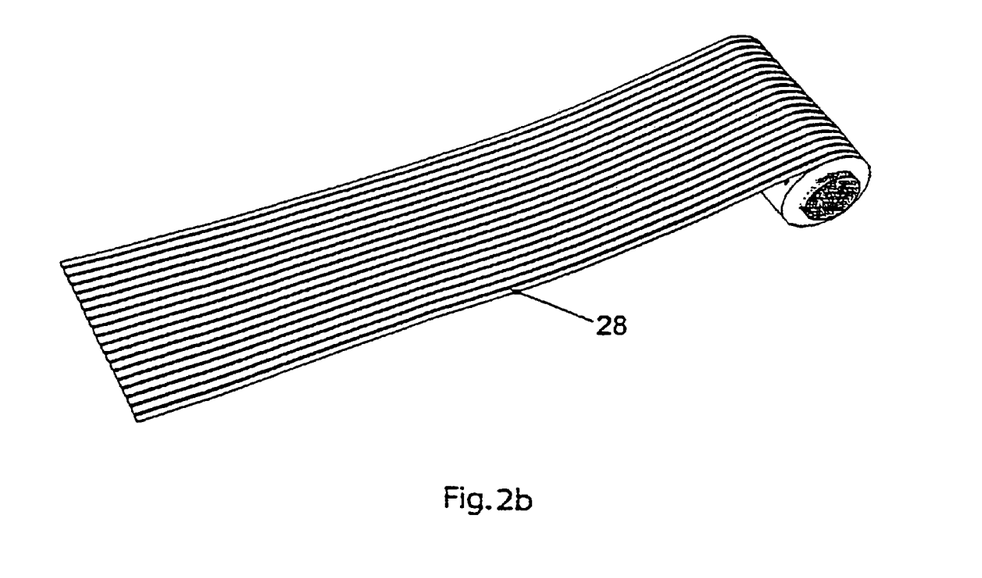
Figure 7:
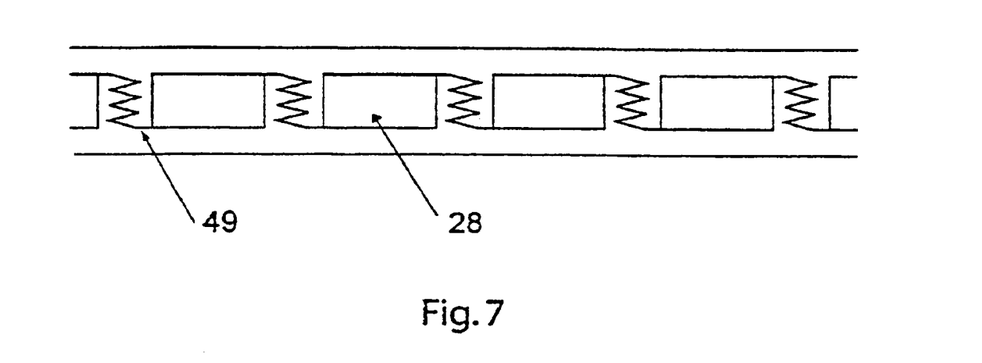
FIG. 7 presents the signal electrode of a band-like sensor element that produces reliable position data.

A typical film-like sensor element according to the invention has a thin sensor film 1, e.g. an electret bubble film having a thickness of 0.07 mm, in the middle inside the element as shown in FIG. 1. Placed above and below the sensor film 1 are thin, e.g. 0.1 mm thick polyester films 2, 3 and 4. Films 2 and 3 are provided with thin aluminum films 5 and 6 of a thickness of e.g. 0.009 mm laminated on their sides facing the sensor film 1. The aluminum film 6 on the surface of film 3 facing film 1 is provided with patterns having the shape of pattern 41 presented in FIG. 2a. The aluminum film 5 on the surface of film 2 forms a continuous band-like pattern having a width of e.g. of the order of 50 cm, which preferably is wider than the pattern 41 on the surface of film 3. On the surface of film 4 there is likewise an aluminum film 7 identical to film 5, placed against film 3. Aluminum film 6 functions as the signal electrode of the sensor element. Aluminum film 5 functions as a zero electrode, i.e. reference electrode. Aluminum film 7 functions as a ground electrode, protecting the sensor against electromagnetic interference and static electricity discharges. Typically, aluminum films 5 and 7 are connected together, in which case they both also act as ground electrodes. The above description represents a preferred structure of the invention. It is also possible to use an arrangement in which the core of the sensor consists of a dielectric film with a pattern like pattern 41 provided on both of its outer surfaces, or even an arrangement in which the core merely consists of a thin metal film with patterns corresponding to pattern 41 made in it by etching. Laminated on either side of this core is a sensor film 1, and the outer surfaces of these two sensor films are provided with earth electrodes, which in this case are also zero electrodes. Another possible arrangement is one in which the aluminum film on the surface of film 2 has been patterned in a manner corresponding to pattern 41 and a film corresponding to film 4 with a ground electrode 7 on its surface has been laminated against film 2. In this case the result is a differential sensor. The aluminum electrodes against the sensor film function as signal electrodes, one positive and the other negative, while the outer aluminum films function as ground electrodes. FIGS. 2b and 7 present an alternative, band-like signal electrode patterning. Sensor material like this can be cut lengthwise to make narrow sensors of a length of hundreds of meters if necessary.

In the manufacture of sensor material (FIG. 3A), a dielectric/metal film 33 is used in which the supporting structure 34 is e.g. a polyester film, but which may also consist of polyethylene or polyimide or some other dielectric film suited for the purpose. The sensor material is made by first laminating on the surface of film 33 a metal film 35, which preferably is of aluminum but which may also be a copper film, which may be later provided e.g. with tinning. However, it is more environmentally friendly to use aluminum film as it can be etched using iron chloride, the disposal of which produces less environmental stress than e.g. the substances used in the etching of copper. The dielectric/aluminum film 33 is unreeled from a roll 31 and it passes under a screen printing screen 37. By means of the screen, a desired pattern 39 is printed on the film from dielectric material 36 dryable e.g. by UV light. Each time a print has been made, the film is moved through a desired distance, yet a distance somewhat shorter than the pattern printed, successive prints thus partially overlapping. The pattern has been so designed that it allows repeated patterns to be printed in order to make various length and width sensors but it also can be designed so that only one size sensors will be manufactured. Instead of silk screen printing, it is also possible to use a device like an ink jet printer which prints the pattern on the film in tiny droplets. After the pattern has been printed, the film is moved forward through a desired distance, through an UV drying oven 38 and is further coiled up on a roll 32. In this manner, a repeated pattern can be printed. In a corresponding manner, an electrode can be printed with silver pasta on the surface of a clean dielectric film. However, this is considerably more expensive than the above-described method of etching the pattern from the aluminum film. After the desired pattern has been printed on the surface of the electrode film using a dielectric material that can withstand etching with iron chloride, the film roll 32 is transferred to an etching and washing line (FIG. 3B), where the metal in the metal surface 35 of the film 34 in the areas not covered by the dielectric film 36 is first etched away using iron chloride, leaving electrodes like e.g. those presented in FIGS. 2A and 2B on the film. After this, the films are washed using e.g. a sodium hydroxide solution 38, which dissolves the printed dielectric material 36 away. The resulting film 33 is a finished film of electrode material. The zero and ground electrode film materials are manufactured in a corresponding manner. Further, the electrode material thus produced, in a manner corresponding to the printing of dielectric material, can be printed with silver pasta in the areas where connectors are to be connected to ensure a good electrical contact in a crimp connection. In this way, a very small amount of expensive silver is consumed as compared with printing the entire electrode surface with silver pasta. It is to be noted that in most used electronic circuit designs the zero and ground electrodes are connected together.

Figure 3A:
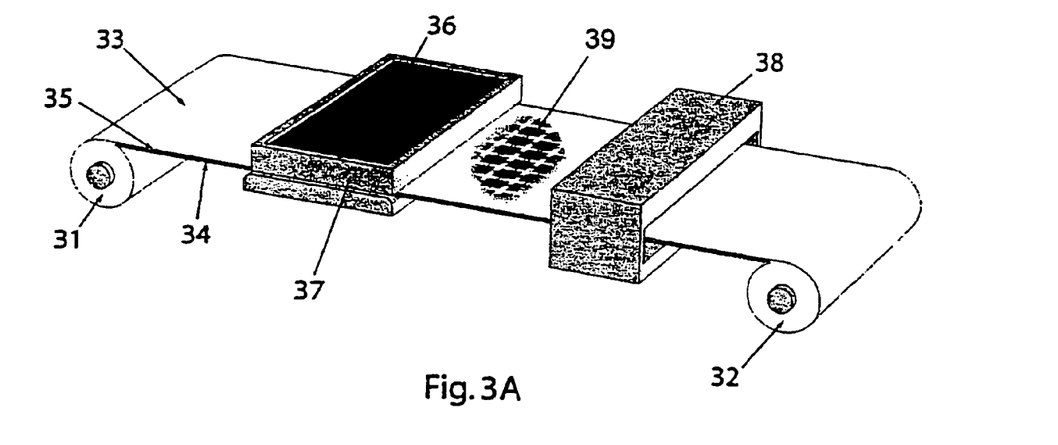
FIGS. 3A, 3B, illustrate the production of signal electrode material.
Figure 3B:
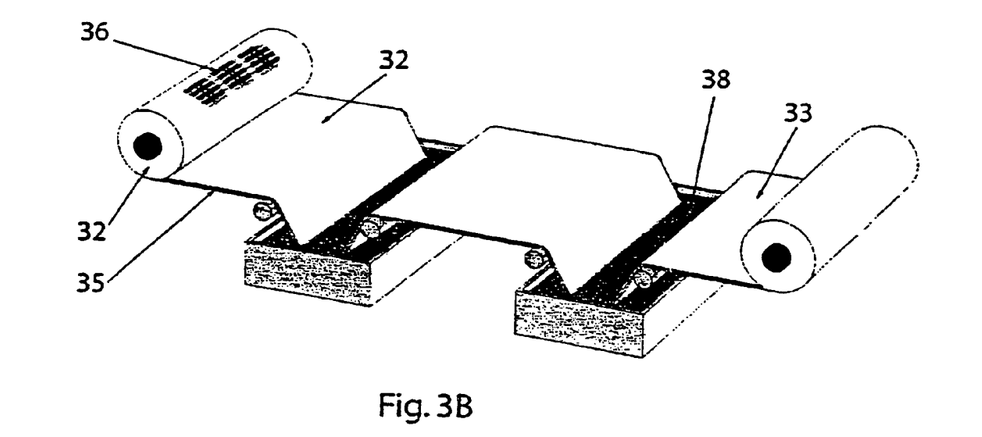
Figure 3C:
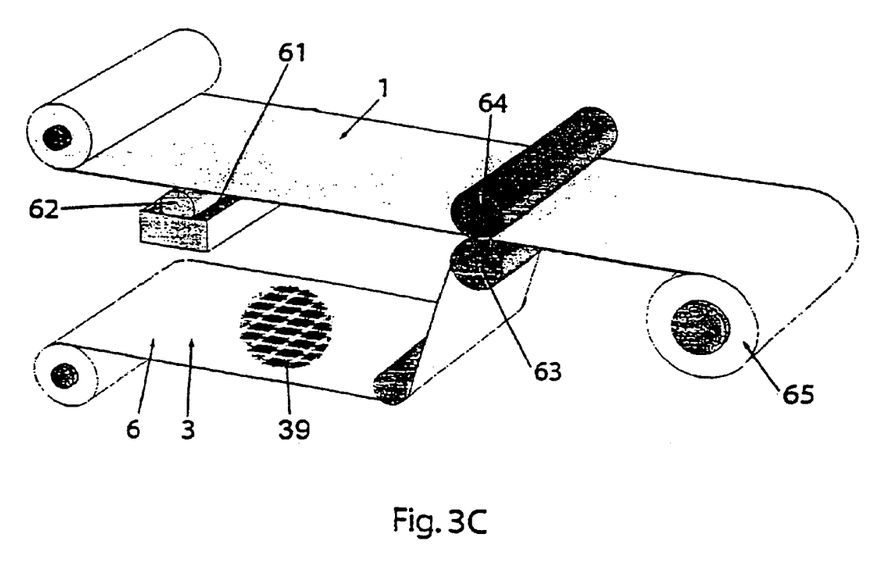

After this, all the films are laminated together using a reel-to-reel (roll-to-roll) laminating apparatus (FIG. 3C). For example, referring to FIG. 1 at the same time, first the sensor film 1, which in a preferred embodiment of the invention is an electret bubble film, and the dielectric/metal film 3, which has been manufactured by the method illustrated by FIGS. 3A and 3B, are laminated together. The aluminum electrode side 6, which has been provided with a desired signal electrode pattern 39, and the sensor film 1 go against each other. In laminating the films together, glue 61 is applied e.g. to the sensor film 1 using a raster roller 62, after which the films are rolled together between rollers 63 and 64. The two films glued together are further rolled up on a roll 65. After this, still referring to FIG. 1, the film 2 with a zero or reference electrode pattern provided in the aluminum film 5 on one of its outer surfaces is laminated onto the laminate thus obtained. Further, to the laminate thus obtained, film 4, i.e. the earth electrode 7 is correspondingly added by laminating against film 3. As a final result, sensor film material as presented in FIG. 1 is obtained. From this material, sensor elements of a desired length are cut using a cutting device suited for the purpose, e.g. a knife. By the method of the invention, in which preferably a repeated pattern is used, it is thus possible to produce sensor elements of a very large length, even hundreds of meters, which consist of a plurality of sections connected together, yet with all their edges well protected against interference.

To a sensor according to the invention, connection leads can be reliably connected using crimp connectors to which the connection leads can be connected e.g. by soldering or crimping. For the crimp connectors, which are pressed through the whole sensor laminate and which thereby form an electric connection to the electrodes, the signal, ground and zero electrodes have been provided with areas to which the connectors can be pressed without creating a short circuit between the signal electrode and the earth/zero electrode. Typically, a sensor element according to the invention (FIG. 4) comprises a lug 44 extending laterally from the signal electrode and consisting of e.g. a wider continuous portion at the end of three leads having a width of the order of 1 mm, to which portion it is possible to connect several crimp connectors, manufactured e.g. by Nicomatic and Berg Electronics, to provide a reliable contact to the signal electrode. When a long sensor element is to be produced, the extra lugs 44 are cut off, thus avoiding interference through these. The ground and zero electrodes 5, 7 are so arranged that they extend in a lateral direction beyond the normal width of the signal electrode and further to the area of these three narrow leads. Thus, when the wide continuous portion is cut off, no extra interference will be produced because the total cross-sectional area of these three narrow leads in relation to the entire length of the side of the sensor is negligible. Further, as their cross-sectional area is so small, a tiny metal particle that may be released when the material is being cut will not cause a short circuit. The connections to the ground and zero electrodes are made using corresponding crimp connectors placed next to the lug 44. The leads are then connected to the crimp connectors e.g. by soldering.

Using the technique of the invention, it is also possible to produce an element consisting of one or more sensor bands by arranging the signal electrode pattern so that, when the etching dielectric is being printed, a continuous band-like pattern 28 (FIG. 2B) is created. An alternative patterning of the narrow band-like sensor material is presented in FIG. 7, in which the connecting strips 49 are of a zigzag design. The width of the signal electrode band may be e.g. 10 mm and the spacing between them may be e.g. 20 mm. When a roll containing continuous sensor band patterns like this and also comprising earth and zero electrodes laminated to it is cut lengthways along the midlines between the signal electrode bands, sensor bands with a good protection against interference and, in the present case, having a width of 20 mm and a 10-mm active area are obtained. If desirable, when laminating the films together, it is possible to use glue that allows the end of the sensor band to be opened and the film layers to be detached from each other so that the electrode surfaces can be cleaned. Thus, the connection leads can be connected directly to different electrode layers.

The connections to a sensor element (FIGS. 2b, 4 and 7) according to one embodiment of the invention with no separate lugs 44 specifically provided in it are made by cutting holes of a diameter of e.g. 15 mm in the outermost dielectric film layers 2 and 4, which have ground and zero electrodes 5 and 7 disposed on their inner surfaces, at any point where the innermost electrode is a signal electrode 44 or 28. The holes are cut using tools 71 and 72 according to the invention, manufactured for this purpose, as presented in FIG. 5A. Pieces of the ground and zero electrodes are cut off from opposite sides, whereupon it is possible to make connections to the signal electrode using crimp connectors or rivets. The tools 71 and 72 consist of two round pins having diameter of e.g. 20 mm. The pin 71 has an extension pin 73 of a diameter of e.g. 4 mm at the center of its end, and the other pin has a corresponding central hole 74, so one of the pins will go partially inside the other. Each pin has a circular cutting edge 75 of a diameter of 15 mm and a height of e.g. 0.1 mm when dielectric/metal films of a thickness of 0.085 mm are used. Now, after a hole 76 having, in the present case, a diameter of 4 mm has been first made in the sensor element using e.g. a suitable bayonet-type tool and the pins are inserted against each other through the said hole and pressed against each other and rotated at the same time, the cutting edges will cut into the sensor to a depth such that the outermost films and the metal electrodes on them are incised and can be removed from the above-mentioned area 77 having a diameter of 15 mm while the signal electrode 41 at the core remains intact (FIGS. 5b and 5c). Further, into this 4-mm hole is inserted a metallic tubular rivet 78, which, when pressed into place, will spread out to the very edges of the hole, thus making a contact 79 to the signal electrode. Under the rivet, a stiffening plastic washer 80 may be used on one side of the element while a toothed metallic washer 81 is placed on the other side to ensure a reliable contact. The rivet is provided with a lug 82 to which a lead can be connected by crimping or welding. In the edge area of the band, where there is no signal electrode at all, a hole is made in a corresponding manner and a rivet is pressed into it to make a connection to the ground and zero electrodes.

The patterning of the element can be implemented as desired according to the intended use. In a manner corresponding to the patterns of the signal, earth and zero electrodes, it can also be provided with an antenna pattern if the sensor is used in a system involving the identification of an object producing an effect on the sensor or other type of identification using a so-called micro-tag, in which the antenna pattern picks out an individual signal of the micro-tag. Such an embodiment may be applicable e.g. in the measurement of sports performances, identification of a patient or identification of a vehicle passing over the sensor. The antenna pattern is preferably made on an extra dielectric/metal electrode film 33 laminated on the surface of the sensor element. The connection of a lead to the electrode can be implemented in a manner corresponding to the case described above. Instead of a tubular rivet, all the lead connections can also be made using crimp connectors having a plurality of small teeth that penetrate the material, as are manufactured e.g. by Nicomatic.

Figure 4:
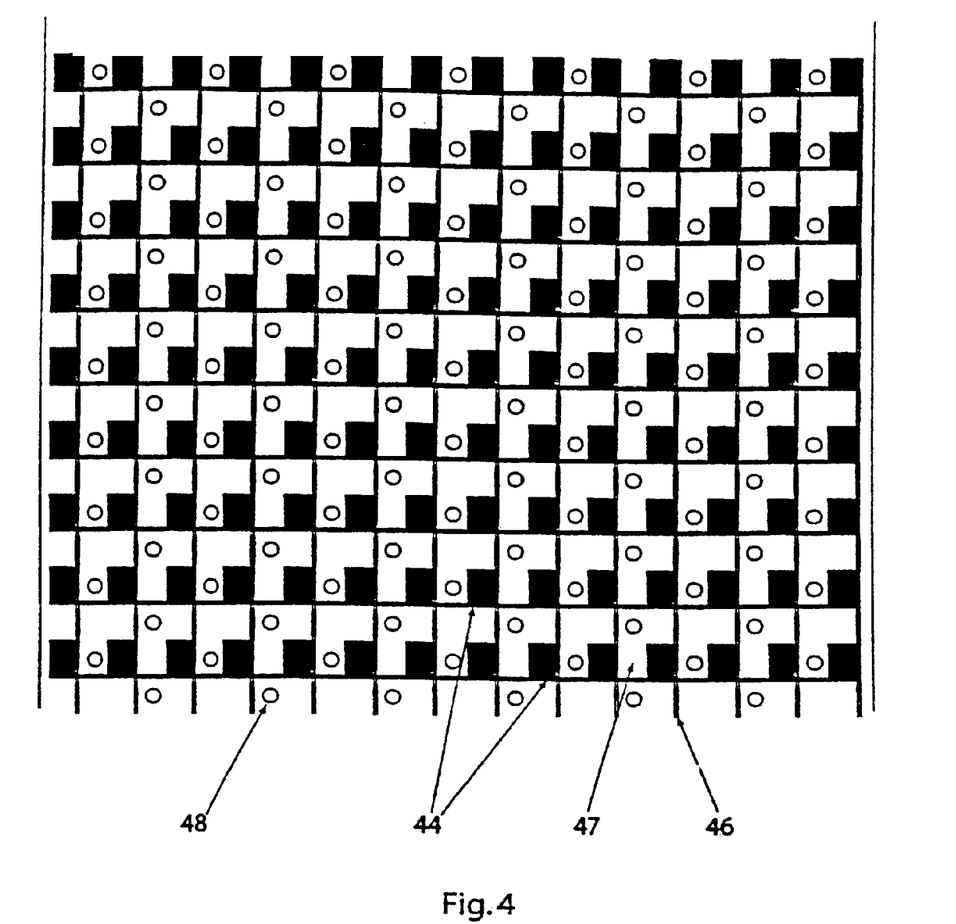
FIG. 4 illustrates the patterning of the sensor band material, which allows the sensor to be cut at desired distances to make it shorter and/or narrower.
Figure 5A:
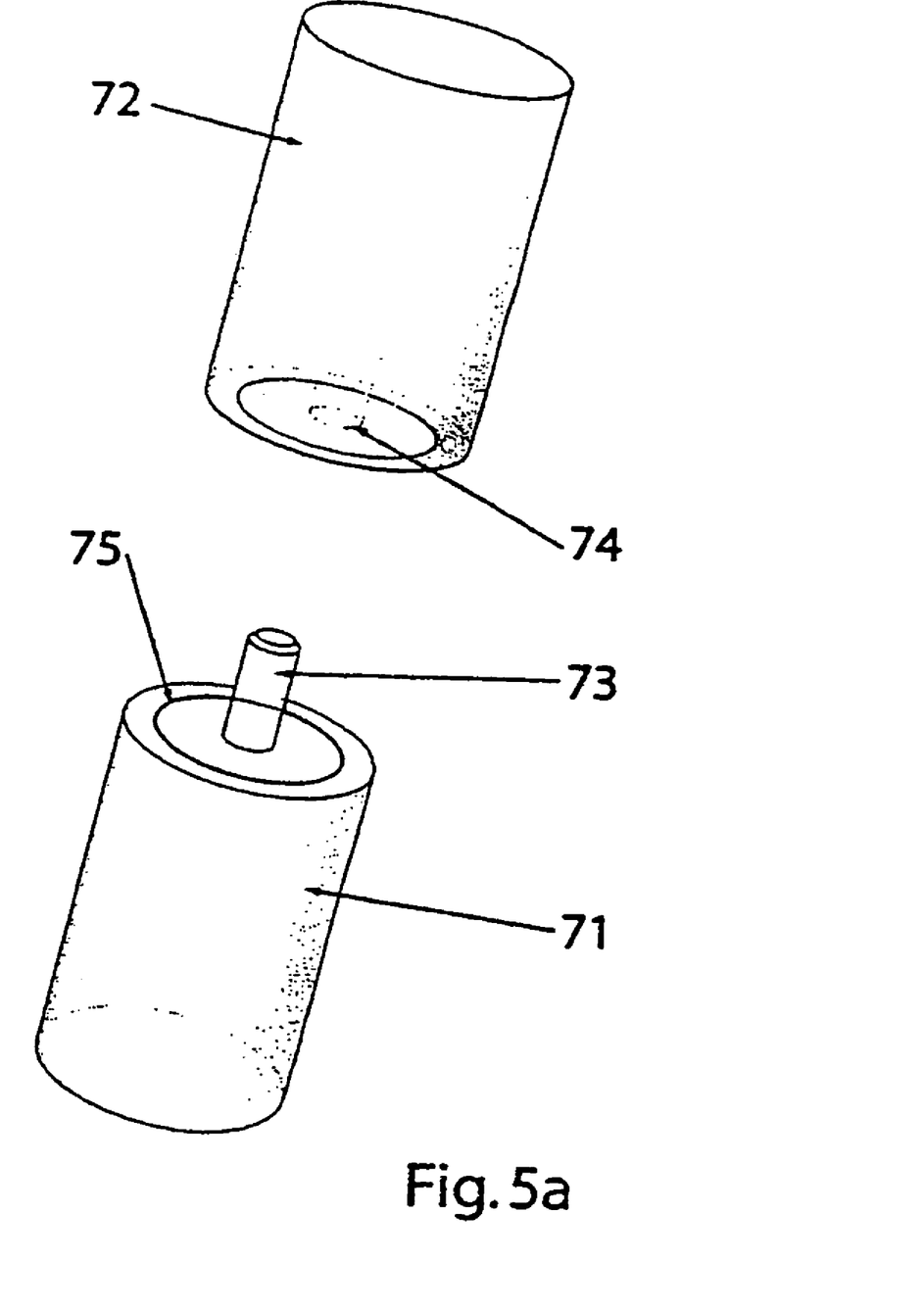
FIG. 5a, 5b, 5c present tools for making connections to the sensor element.
Figure 5B:
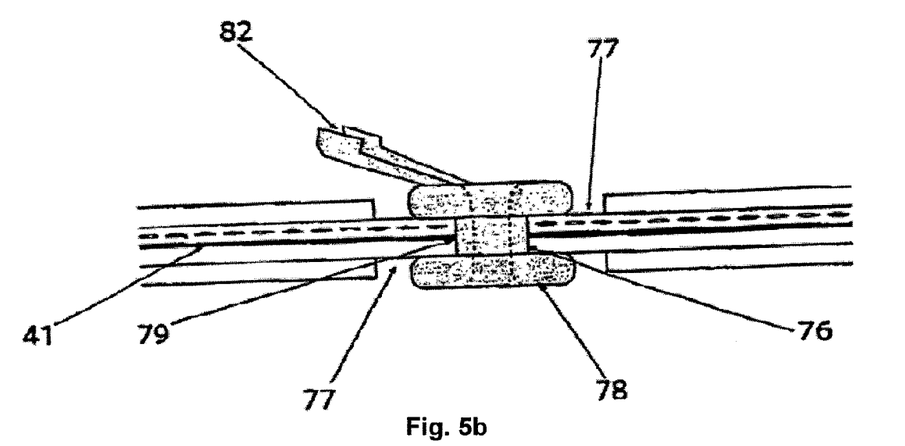
Figure 5C:
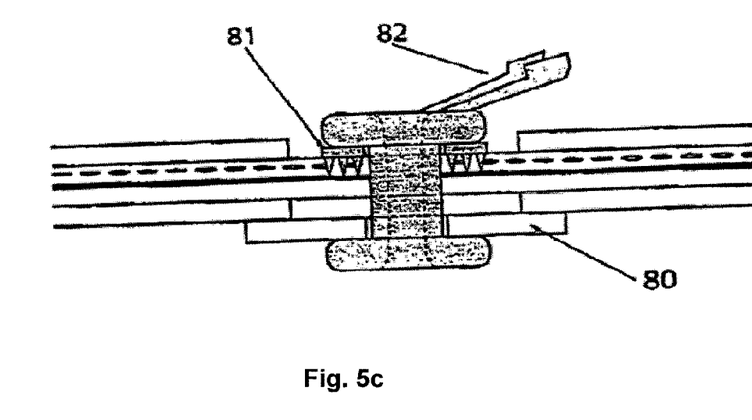

FIG. 4 presents a part of the signal electrode of one type of sensor element material according to the invention, which is applicable for many uses. Here, the signal electrode consists of checks 44 of a small size, e.g. 25×25 mm, with a relatively wide gap 47 between them. The checks are connected together by one or a few very narrow connector strips 46. The checks may naturally also comprise round shapes, e.g. their corners may be rounded, or they may also be completely circular. They may also be of a triangular shape or they may have more than four corners. From such a sensor element, it is easy to produce sensors of a desired shape, e.g. floor sensors by cutting the sensor element into the desired shape using a corresponding grid or other alignment pattern arranged on the outer surface of the sensor element as an aid. Thus, it is possible to arrange for a connecting strip of a width of one check to run continuously from a sensor element mounted in the actual place of use to a wall and further up along the wall. This arrangement obviates the need to provide a connection lead under a carpet, where it would be readily visible and exposed to damage; instead, a completely unnoticeable floor sensor is achieved. A connection to such a sensor can be made in the manner described above. Further, a sensor element material with a signal electrode patterned in this manner can be provided with small holes 48, e.g. of a diameter of 10 mm, by punching by a roll-to-roll technique at regular distances in the areas 47 between the checks 44. Via such holes, the sensor element can be fastened to a concrete floor by means of surface leveling putty, which will fasten directly to the concrete in the area of the holes.

The cutting of the outermost layers without damaging the signal electrode can also be performed using a cutting device consisting of a pair of self-locking pliers with jaws, handles and a locking part for locking the jaws to a desired distance between them. The lower jaw is fitted with a horizontal metal plate and the upper jaw with a vertical cutter. Using such a cutting device, the earth and zero electrodes can be cut off from the sensor element by adjusting the cutter exactly to the correct depth, leaving the signal electrode layer intact.

After the leads have been connected to the crimp connectors and a metallic screen connected to the earth electrode has been arranged across the connection point if necessary, the connection point can be made watertight by pressing silicone pads of a sufficient size onto it using heat as an aid.

Figure 6:
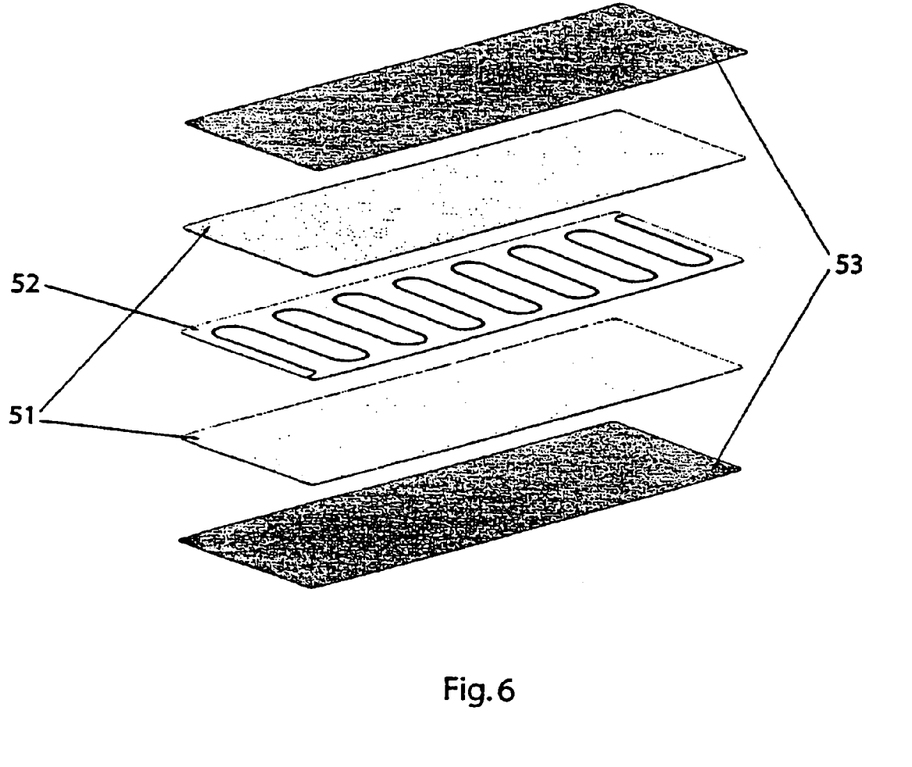
FIG. 6 presents a sensor material with a serpentine signal electrode.

FIG. 6 further presents the cross-sectional structure of a sensor material according to the invention, which has a serpentine signal electrode 52 placed between two sensor films, such as e.g. elastic plastic films 51 of a bubble structure, while the outermost layers are film-like ground electrodes 53 made of a conductive material and having the same size as the plastic films 51. The sensors can be produced by cutting a sensor material manufactured by a roll-to-roll technique transversely between two adjacent, parallel electrodes. In this case, too, as the signal electrode is sufficiently narrow, its cross-sectional area in relation to that of the entire sensor element is very small, and therefore no disturbing interference will arise.

To a sensor element of the invention, it is possible to connect a transmitter-receiver apparatus for determining the intensity and point of application of a force or pressure applied to the sensor from the signals obtained from the sensor, comprising a transmitter unit working in the microwave range which sends signals in the microwave range to the signal electrode of the sensor, and a receiver unit which receives the signals reflected back from the signal electrode.

To determine the intensity and point of application of a force or pressure applied to the sensor from voltage signals obtained from the sensor, it is possible to make use of the connecting strips 49 of a signal electrode as presented in FIG. 7. Based on the delay introduced by the resistance of the connecting strips, it is possible to determine the point of application. By shaping the connecting strips in a zigzag fashion, thus increasing their length as much as possible, and using a line width as small as possible, their resistance can be increased, thus facilitating the signal processing needed for the determination of position data.

Figure 8:
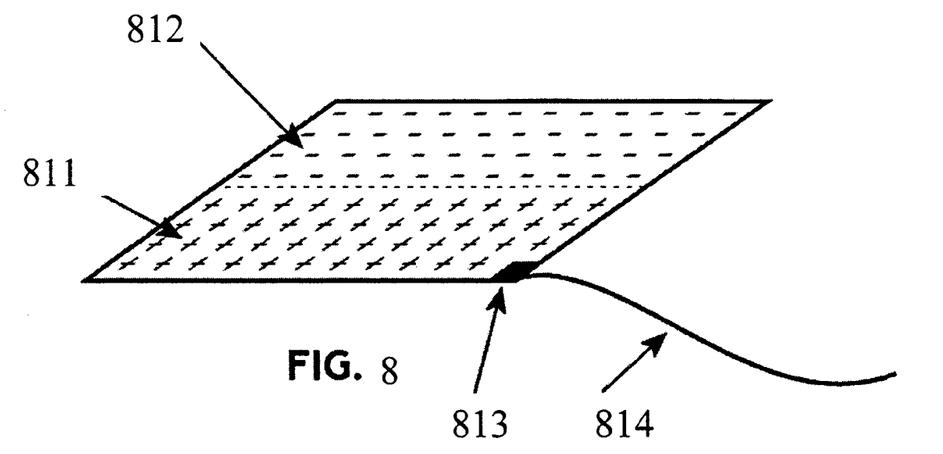
FIG. 8 presents a sensor of one embodiment of invention, with automatic zeroing the signals generated by air pressure changes.

FIG. 8 presents one other inventive part of this invention, which is to obtain a sensor material that automatically eliminates the signals generated by ventilation, air-pressure changes or large building vibrations, and avoids the need to have multiple sensors with opposite charges summed together. FIG. 8 shows a sensor which has approximately one half of its area 811 with positive charge against signal electrode and other half 812 with negative charge. Any force generated over the entire area produces no or very little signal in the between the electrodes connected at connection joint with signal wire 814 further leading into signal processing unit. To achieve this the charging of the material is done with two opposite polarity electrodes ie. + and −. Upon charging the material in high electric field, the material goes from one reel to another reel, below electrodes. To other electrode, which covers the other half of material width, a positive voltage is applied, and to other electrode, which covers the other half of materials width, a negative voltage is applied. With kind charging a new type charged sensor film is obtained. When this type film is laminated together with electrodes as described earlier, a sensor cut from material like this does not produces very low signal or no signal at all from a force generated over the entire area of sensor but for example touch of feet anywhere the sensor area, or vital functions of a person laying over the sensor, does produce a noticeable signal. This type sensor eliminates most of the harmful false alarms for example in various safety and security applications. To make a ribbon type sensor that has same inventive effect, it possible first to charge the film so that one side has same polarity over the entire area, and then charge the same film again so that an opposite polarity voltage is connected to electrode covering the entire width of material, for example for every second 5 meters length. A long, say several hundreds meters long ribbon cut from sensor material with this type charged film, installed in a fence, would not generate high amplitude peaks from a rain or wind, but works well to notice an intruder that tries to climb over the fence.

It is obvious to the person skilled in the art that different embodiments of the invention are not restricted to the example described above, but that they can be varied within the scope of the claims presented below.

The invention claimed is:

1. A method of manufacturing an electromechanical sensor element,
the sensor element comprising a surface provided with a metallic electrode; the method comprising the steps of:
    (a) producing an electrode film comprising electrode patterns, the patterns comprising a plurality of connecting areas;
    (b) laminating a sensor film and the electrode film in a reel-to-reel process to form a sensor element material film; and
    (c) cutting the sensor element material film according to a desired length, width and/or shape to form the electromechanical sensor element;
    wherein one of step (a) and (b) comprises a first connecting area of the plurality of the connecting areas, the first connecting area having a zigzag pattern.

2. The method of claim 1, wherein step (c) comprises cutting the sensor element material film lengthwise so that the electromechanical sensor element comprises an elongated shape and comprises a plurality of the electrode patterns to form an elongated electrode pattern.

3. The method of claim 1, wherein one of step (a) and (b) comprises arranging the first connecting area or a second connecting area of the plurality of the connecting areas to be disposed on at least one side area of the sensor element material film.

4. The method of claim 1, wherein at least one of the electrode patterns comprises a polygonal shape.

5. The method of claim 1, wherein at least one of the electrode patterns comprises a round shape.

6. The method of claim 1, wherein the metallic electrode comprises substantially aluminum.

7. The method of claim 1, further comprising a step of providing holes in the sensor element material film.

8. A method of manufacturing an electromechanical sensor element, the method comprising the steps of:
    (a) providing a metallic film;
    (b) printing a dielectric pattern corresponding to an electrode on an exposed side of the metallic film in a reel-to-reel process;
    (c) removing metallic material of the metallic film from an area outside the dielectric pattern by etching in a continuous process from reel-to-reel to form a patterned electrode film;
    (d) laminating a sensor film and the patterned electrode film in a reel-to-reel process to form a sensor element material film; and
    (f) cutting the sensor element material film according to a desired length, width and/or shape to form the electromechanical sensor element.

9. The method of manufacture of claim 8, wherein step (b) is performed by providing narrower connecting strips forming and interconnection in the patterned electrode film.

10. The method of claim 9, wherein the connecting strips comprise a zigzag pattern.

11. The method of claim 8, wherein step (f) comprises cutting the sensor element material film lengthwise so that the electromechanical sensor element comprises an elongated shape and comprises a plurality of the electrode patterns to form an elongated electrode pattern.

12. The method of claim 11, wherein at least one of the electrode patterns comprises a polygonal shape.

13. The method of claim 11, wherein at least one of the electrode patterns comprises a round shape.

14. The method of claim 8, wherein the metallic film comprises aluminum.

15. The method of claim 8, wherein step (b) is performed by printing at least one pattern portion with silver paste.

* * * * *